US010979311B2

(12) United States Patent
Bennett et al.

(10) Patent No.: US 10,979,311 B2
(45) Date of Patent: Apr. 13, 2021

(54) SYSTEM AND METHOD FOR VALIDATING NETWORK CONFIGURATION CHANGES IN A CLIENT ENVIRONMENT

(71) Applicant: SCHNEIDER ELECTRIC USA INC., Andover, MA (US)

(72) Inventors: John Bennett, Garrett Park, MD (US); Kevin Abram Heater, Fort Collins, CO (US); Michael Louis Braun, Fort Collins, CO (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 0 days.

(21) Appl. No.: 15/398,654

(22) Filed: Jan. 4, 2017

(65) Prior Publication Data
US 2017/0195187 A1 Jul. 6, 2017

Related U.S. Application Data

(60) Provisional application No. 62/275,105, filed on Jan. 5, 2016.

(51) Int. Cl.
*H04L 12/24* (2006.01)
(52) U.S. Cl.
CPC .......... *H04L 41/22* (2013.01); *H04L 41/0813* (2013.01); *H04L 41/0866* (2013.01); *H04L 41/145* (2013.01); *Y04S 40/00* (2013.01)
(58) Field of Classification Search
CPC . H04L 41/22; H04L 41/0866; H04L 41/0813; H04L 41/145; G06F 17/30241; Y04S 40/162
See application file for complete search history.

(56) References Cited

U.S. PATENT DOCUMENTS

| 6,643,669 | B1 | 11/2003 | Novak et al. |
| 7,054,799 | B1 | 5/2006 | Hartell et al. |
| 7,647,136 | B2 | 1/2010 | McDowell |
| 2003/0033117 | A1 | 2/2003 | Sage |
| 2004/0236620 | A1 | 11/2004 | Chauhan et al. |
| 2007/0168923 | A1* | 7/2007 | Connor ............... G06F 17/50 717/104 |

(Continued)

OTHER PUBLICATIONS

Collins-Sussman et al., "Version Control with Subversion, for Subversion 1.7", 2011 (Year: 2011).

(Continued)

*Primary Examiner* — Ranodhi Serrao
(74) *Attorney, Agent, or Firm* — Lando & Anastasi, LLP

(57) ABSTRACT

System and method for validating distribution network configuration changes in a client environment are disclosed. The system residing on a client device detects network configuration changes made by a user. The disclosed system, working with a locally stored model of the network, validates the network configuration changes against one or more validation rules that are also stored locally in the client device. When validating the network configuration changes, the disclosed system can perform a number of network engineering calculations to detect invalid network configuration changes. The disclosed system then provides graphical feedback in real time to inform the user of any invalid network configuration changes.

20 Claims, 9 Drawing Sheets

(56) References Cited

U.S. PATENT DOCUMENTS

| | | | |
|---|---|---|---|
| 2008/0077368 A1* | 3/2008 | Nasle | G05B 17/02 703/4 |
| 2008/0091742 A1 | 4/2008 | Marshall | |
| 2008/0300834 A1 | 12/2008 | Wiemer et al. | |
| 2010/0191774 A1* | 7/2010 | Mason, Jr. | G06F 17/30088 707/797 |
| 2011/0209081 A1 | 8/2011 | Chen et al. | |
| 2012/0022713 A1* | 1/2012 | Deaver, Sr. | G05B 17/02 700/298 |
| 2012/0066578 A1 | 3/2012 | Robin et al. | |
| 2013/0179140 A1* | 7/2013 | Sharma | G06F 17/509 703/13 |
| 2013/0211797 A1 | 8/2013 | Scolnicov et al. | |
| 2015/0012148 A1 | 1/2015 | Bhageria, Jr. et al. | |
| 2015/0180538 A1 | 6/2015 | Smith et al. | |
| 2017/0193029 A1 | 7/2017 | Bennett et al. | |
| 2017/0195188 A1 | 7/2017 | Bennett et al. | |
| 2017/0206292 A1 | 7/2017 | Bennett et al. | |

OTHER PUBLICATIONS

Ash, Jeff, et al. "Optimizing complex networks for resilience against cascading failure," Physica a: statistical mechanics and its applications 380 (2007): 673-683, (Year: 2007).

Dharchoudhury, Abhijit et al. "Design and analysis of power distribution networks in PowerPC™ microprocessors," Proceedings 1998 Design and Automation Conference, 35th DAC, (Cat. No. 98CH36175), IEEE, 1998, (Year: 1998).

Hijazi et al., "IFC to CityGML transformation framework for geo-analysis: a water utility network case," 4th International Workshop on 3D Geo-Information, Nov. 4-5, 2009, Ghent, Belgium, 2009. (Year: 2009).

Lee, Jiyeong, "3D data model for representing topological relations of urban features," Proceedings of the 21st annual ESRI international user conference, San Diego, CA, USA, 2001. (Year: 2001).

Lee, Jiyeong, "A spatial access-oriented implementation of a 3-D GIS topological data model for urban entities," GeoInformatica 83 (2004): 237-264. (Year: 2004).

Sharma, Mithun J. et al. "Analytic hierarchy process to assess and optimize distribution network," Applied Mathematics and Computation 202.1 (2008): 256-265, (Year: 2008).

Sherali, Hanif D. et al. "A global optimization approach to a water distribution network design problem," Journal of Global Optimization 11.2 (1997): 107-132, (Year: 1997).

Shimizu, Yoshiaki, and Hiroshi Kawamoto, "An implementation of parallel computing for hierarchical logistic network design optimization using PSO," Computer Aided Chemical Engineering, vol. 25, Elsevier, 2008. 605-610.

* cited by examiner

| ID | Adjacent IDs | Source ID | Phases |
|---|---|---|---|
| 1 | 100 | 1 | ABC |
| 100 | 10 | 1 | ABC |
| 10 | 101 | 1 | ABC |
| 101 | 20 | 1 | ABC |
| 20 | 102 | 1 | ABC |
|  | 103 | 1 | B |
| 102 | 50 | 1 | ABC |
| 50 | 200 | 1 | ABC |
|  | 201 | 1 | ABC |
|  | 202 | 1 | ABC |
| 200 | 60 | 1 | ABC |
| 201 | 61 | 1 | ABC |
| 202 | 62 | 1 | ABC |
| 103 | 51 | 1 | B |
| 51 | 300 | 1 | B |
|  | 301 | 1 | B |
|  | 302 | 1 | B |
| 300 | 40 | 1 | B |
| 301 | 41 | 1 | B |
| 302 | 42 | 1 | B |

```
enum Phases { None, A, B, C, AB, BC, AC, ABC }
class ElectricDirectedEdge
{
        int FromVertexIndex;
        int ToVertexIndex;
        int SourceIndex;
        Phases Phases;
}
class ElectricNetwork<TVertex>
{
        // The electric features in the network, represented by a
        common base class or interface (TVertex).
        TVertex [ ] NetworkObjects;

// Array of directed adjacency lists.
        List<ElectricDirectedEdge> [ ]  OutboundEdges;
        List<ElectricDirectedEdge> [ ]  InboundEdges;

// Mapping of external object IDs (the TVertex type) onto array
        indexes.
        Dictionary<TVertex, int> MapNetworkObjectToArrayIndex;
}
```

*FIG. 5*

SYSTEM AND METHOD FOR VALIDATING NETWORK CONFIGURATION CHANGES IN A CLIENT ENVIRONMENT

The present application claims priority to and benefit from U.S. Provisional Application Ser. No. 62/275,105 entitled "System and Method for Validating Network Configuration Changes in a Client Environment" and filed on Jan. 5, 2016, which is incorporated herein by reference in its entirety.

BACKGROUND

Utility companies provide services such as electricity, gas, water, telecommunication, cable television, etc., to customers. All of these services require a distribution network for the area that is being serviced. As used herein, a distribution network comprises of pipelines, cables, and/or other equipment to facilitate distribution of a utility to customers. For example, an electrical distribution network comprising of cables/overhead lines and sub-stations facilitates distribution of electricity from a transmission/sub-transmission network to customers. Data representing the distribution facilities (poles, conductors, transformers, switching and protective equipment, etc. for electric distribution utilities) are stored in a facilities database, typically a relational database that includes geospatial attributes (i.e. a Geographic Information System, or GIS). Various software applications such as network design applications are available to design and edit distribution networks. These existing network design applications typically work directly against the GIS database model and execute queries and calculations in the GIS. Moreover, such applications typically enable engineering analyses to be performed as part of post-edit operations.

For example, consider a network design that is being edited by a user using an application. The application typically provides some type of "build" functionality which causes execution of one or more queries on a network model data stored in the GIS, when invoked. The results from the query executions provide an indication as to whether the edits have been successfully applied to the network model. This approach to checking for errors in network design by querying the GIS increases the application response time. Moreover, if the results from GIS indicate that some of the edits cannot be applied to the network design (e.g., because the edits violate design rules), depending on how much editing was done before "building" the network design, the user may need to spend considerable time fixing those errors in the network design. Even after the user has fixed the errors, the user would need to "rebuild" the network design to check against the GIS whether the fixes can be applied to the GIS network model. Overall, the existing technique of validating distribution network designs in the GIS is an inefficient process that consumes more network resources (e.g., bandwidth) and causes poor application performance. At least in part because of these inefficiencies, existing network design applications are typically not suitable for mobile devices that have power and bandwidth constraints.

The need exists for a network design application that overcomes the above problems, as well as one that provides additional benefits. Overall, the examples herein of some existing or related methods and/or systems and their associated limitations are intended to be illustrative and not exclusive. Other limitations of existing methods and/or systems will become apparent to those of skill in the art upon reading the following Detailed Description.

BRIEF DESCRIPTION OF THE DRAWINGS

FIG. 4 is a graphical diagram illustrating an adjacency list for a directed graph created from the undirected graph in FIG. 3.

FIG. 5 is a diagram illustrating an example code representation of an electric network model.

DETAILED DESCRIPTION

Figure 1:
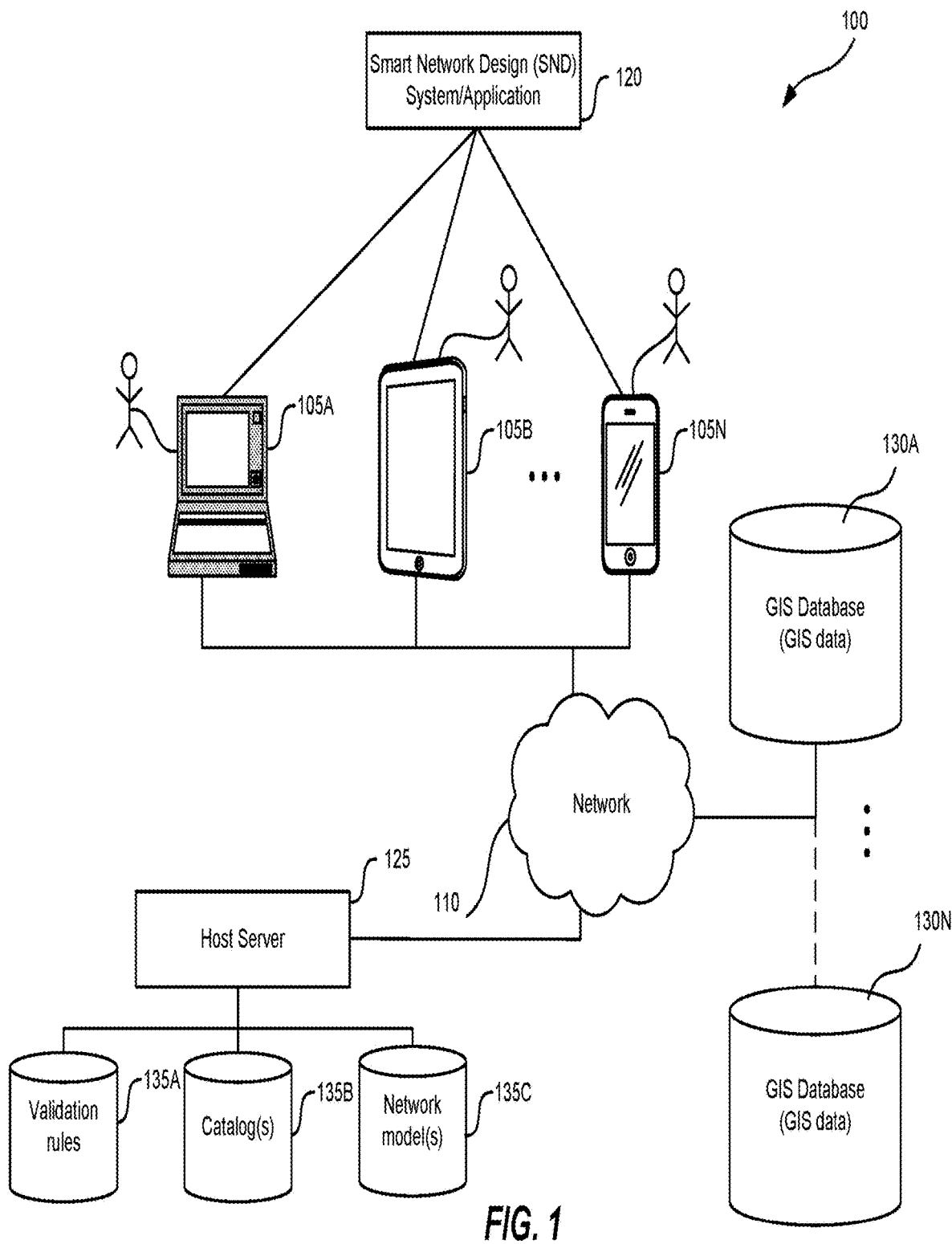
FIG. 1 is a block diagram illustrating an example environment in which a system and method for validating a network design in a client environment (hereinafter "disclosed system") can operate.

A system and method for validating distribution network configuration changes in a client environment (hereinafter "disclosed system") are disclosed. In some embodiments, the disclosed system resides in a client device and provides a design environment that includes various features and functionalities for manipulating (e.g., viewing, editing and/or analyzing) a network design.

In some embodiments, the disclosed system can provide validation of and feedback on network configuration changes in real time or near real-time to help users make an informed decision regarding, for example, placement or configuration of components in a network design. The real-time validation and feedback on the network configuration changes are enabled by a network modeling construct whereby the disclosed system works against a locally stored (e.g., in-memory) model of the network ("geospatial network model" or "network model") instead of a model of the network stored remotely such as the GIS (Geographic Information System) database model. The creation of the network model is described in detail in concurrently filed, co-pending U.S. application Ser. No. 15/398,611 entitled "System and Methods for Creating a Geospatial Network Model in a Client Environment," the entire content of which is incorporated herein by reference in its entirety. The network model describes the network using a specialized data structure comprising of a collection of directed (or undirected) adjacencies between objects in the distribution network.

In some embodiments, the real-time validation of network configuration changes against the network model that is stored locally (e.g., cache memory) in a client device is based on validation rules that are also locally stored on the client device. In some embodiments, the process of validating the network configuration changes can include performing various network analyses and/or engineering calculations. In some embodiments, network analyses and/or engineering calculations can be performed outside of the validation process. The types of analyses and calculations to be performed depend on the distribution network in question. Some examples of network analyses include gas pressure flow analysis, electric load flow analysis, short-circuit analysis (e.g., calculating fault currents or short circuit currents), and/or the like.

Consider for example an electric distribution network. In order to validate network configuration changes in the network, the disclosed system can calculate current and voltage through various components impacted by the network configuration changes. The result of such calculations along with the requirements specified by the validation rules can be used by the disclosed system to detect any overcurrent/undervoltage conditions caused by the network configuration changes. The disclosed system can then present on a user interface, interactive feedback on the detected validation issues. The interactive feedback can be presented in a geospatial and/or schematic views of the network. In some implementations, the validation issues, including detail information about the issue, can be populated in an aggregated list. The user can navigate to the location of any validation issue directly from the aggregated list.

With both the network model and the validation rules available locally in the client device, queries and calculations against the network model can be performed by the disclosed system at a much faster speed than previously possible. To the end user, the feedback on each change to the network configuration within the design environment can appear instantaneously, and can help the user make an informed decision on the placement or configuration of the subsequent components in a network. Without the rapid feedback, the user may end up creating or editing a large segment of a network that does not meet the specification. This can lead to waste of significant amount of time and effort. Moreover, the disclosed system in some embodiments can enable various engineering calculations to be performed in real time during the design process using the design application. The integration of engineering calculation tools in the design environment eliminates the need to use separate engineering calculation applications, and streamlines the process of creating and editing networks.

By way of example, consider a geospatial view of an electric distribution circuit. As soon as a user interacts with the geospatial view to add an object (e.g., a service point) to the circuit, the disclosed system can calculate the effect of the addition of the service point on other devices whose performance is sensitive to the total load. If any of the devices become overloaded as a result of the newly added service point, the disclosed system can immediately flag the issue and identify the impacted devices. In some embodiments, the disclosed system can also recommend adjustments to resolve the issue. By way of another example, a user may move a pole in a network design, and as soon as the change is detected, the disclosed system can increase the length of conductor segments, analyze the resulting voltage drop against standards and recommend changes to the network as needed (e.g., increasing conductor diameter) to bring the network back into standard. All of these analyses and validations can be performed by the disclosed system client-side, without querying the GIS database model. As a result, the disclosed system eliminates the need to send/receive data to/from a GIS database each time a user makes changes to a network design. In fact, with the disclosed system, there is no need to maintain connectivity to the GIS database at all. This has the advantage of improving the performance of the design application as well the user experience with the application, and making the network design process more efficient.

These and various other embodiments of the disclosed system will now be described in detail.

1. Example Environment

FIG. 1 is a block diagram illustrating an example environment in which a system and method for validating a network design in a client environment (hereinafter "disclosed system") can operate.

As illustrated, the environment 100 comprises one or more client devices 105A-N (hereinafter "client device 105"), a communication network 110 and one or more GIS databases 130A-N (hereinafter GIS database 130). The client device 105 can be any hardware device that is able to establish a connection with another device or server, directly or via a communication network 110. Examples of a client device 105 include, but are not limited to: a desktop computer, a thin-client device, a mobile computing device such as a notebook, a laptop computer, a handheld computer, a mobile phone, a smart phone, a tablet, a phablet, and/or the like. The client device 105 typically includes one or more input/output devices to facilitate user interaction (e.g., to display a map, to enable a user to make a selection of an area on the map). In some embodiments, the disclosed system can be embodied in a smart network design application 120 (hereinafter "design application 120") which is installed in the client device 105. The design application 120 can be downloaded from a server (e.g., host server 125, an application store or a repository) and installed on the client device 105. In some embodiments, the design application 120 can be a web-based application that can be accessed via a web-browser. In some embodiments, the web-based application can operate by utilizing data stored in the browser's local storage (i.e., network model data remains in the client device but the data may be periodically backed up in the host server or a cloud). Various components or modules of the disclosed system are described in detail in reference to FIG. 2.

The GIS database 130 is a database or file structure that stores objects defined in a geometric space. One example of a GIS database is a geodatabase. Typically, each utility maintains its own GIS database. For example, a gas company can have its own GIS database that stores feature data for its gas distribution network. Similarly, an electric company can have its own GIS database that stores feature data for its electric distribution network. The GIS database 130 typically supports query execution on stored data as well as manipulation of the stored data. Examples of data stored in the GIS database include, but are not limited to: geometry or shape data and attributes of objects, typically grouped into different feature classes. In some embodiments, the GIS database 130 can also store adjacency relationships between database objects (i.e., undirected network). The GIS database 130 may be implemented in Microsoft SQL Server, PostgreSQL relational database management systems, Microsoft Access, Oracle, IBM DB2, IBM Informix, and/or the like.

In some embodiments, the environment 100 includes a host server 125. The host server 125 can provide access to data needed to perform client-side validation of network designs. For example, the host server 125 can maintain one or more databases or database tables for storing validation rules 135A, catalogs 135B and network models 135C. The validation rules 135A can include rules to ensure that a network design meets certain requirements and/or standards. Typically, validation rules are specific to a distribution network. For example, in a gas distribution network, an applicable validation rule may be the diameter of a gas valve must match the diameter of the pipe to which the valve is snapped. By way of another example, in an electric distribution network, an example validation rule may be that the rated kVA of a transformer must be equal to or greater than 80% of the sum of estimated peak loads of the customers connected to the transformer. In some embodiments, the validation rules can be configured and extended to meet the specific requirements of a user (or designer) or an organization.

The catalogs 135B can store components and design configurations that a network designer can use to design a network. The catalog of components can be grouped into project files. A project file specifies a network configuration (i.e., amplifier cascade count, frequency range, target customer counts to reach per branch, etc.) as well as components and cables that have been determined to work well (and are in active inventory rotation) for the given network configuration. Grouping components into project files ensures that a selected component will work for the given design configuration and with the other components specified by a project file. This grouping also aids in efficient creation of a network design by greatly reducing the set of components to choose from in the designer's toolbox—from all components held in an organization's inventory to just a subset selected for the particular design configuration at hand. In some embodiments, the disclosed system can download and store locally on the client device one or more project files associated with one or more network models stored in the client device.

The network models 135C can store various representations of network components and topologies associated with designs. The network models are generally created client-side, and can be uploaded to the host server 125 periodically or on demand for back up or for reuse.

The communication network 110, over which the client device 105, the one or more GIS databases 130 and the host server 125 can communicate may be a telephonic network, an open network, such as the Internet, or a private network, such as an intranet and/or the extranet. The communication network 110 can be any collection of distinct networks operating wholly or partially in conjunction to provide connectivity to the client devices 105 and the GIS databases 130 and may appear as one or more networks to the serviced systems and devices. In some embodiments, communications can be achieved by a secure communications protocol, such as Secure Sockets Layer (SSL), or Transport Layer Security (TLS).

In addition, communications can be achieved via one or more wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, 4G-LTE networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The client devices 105 can be coupled to the communication network 110 (e.g., Internet) via a dial up connection, a digital subscriber loop (DSL, ADSL), cable modem, and/or other types of connection. Thus, the client devices 105 can communicate with remote servers (e.g., host server 125, GIS database 130, mail server, instant messaging server), some of which may provide access to user interfaces of the World Wide Web via a web browser, for example.

2. Example System

Figure 2:
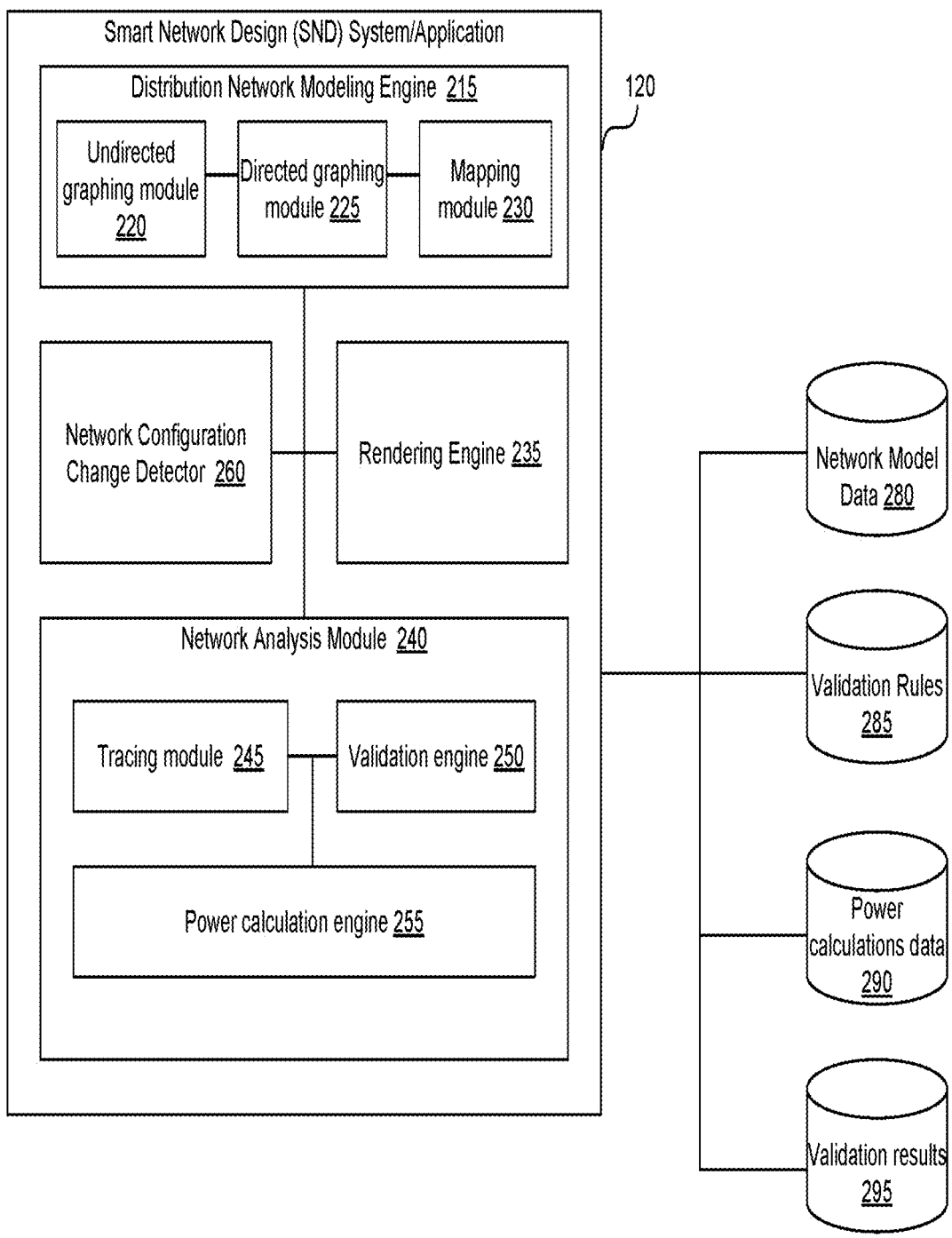
FIG. 2 is a block diagram illustrating example components of a smart network design application or system in accordance with some embodiments of the disclosed system.

FIG. 2 is a block diagram illustrating example components of the disclosed system in accordance with some embodiments.

In some embodiments, the disclosed system resides in a client device (e.g., client device 105) and comprises a distribution network modeling engine 215 having an undirected graphing module 220, a directed graphing module 225, and/or a mapping module 230, a rendering engine 235, a network configuration change detector 260, and a network analysis module 240 having a tracing module 245, a validation engine 250, and/or a power calculation engine 255. In some embodiments, various data utilized by the components of the disclosed system and/or generated by the disclosed system including, for example, network model data 280, validation rules 285, power calculations data 290 and validation results 295 can be stored locally on the client device. The disclosed system via one or more of these components can handle rapid updates to network configurations and perform validation calculations from those changes. Some embodiments of the disclosed system can include more or less components. Each of these components will now be described in detail.

The distribution network modeling engine 215 generates the network model that supports various operations such as visualization, analysis (e.g., tracing, load flow analysis, operating voltage calculations) and/or editing on a distribution network. The network modeling engine 215, via the undirected graphing module 220, the directed graphing module 225 and/or the mapping module 230, can transform GIS feature data obtained from a GIS database (e.g., GIS database 130 described in reference to FIG. 1) into a specialized data structure that can be utilized by the network analysis module 240 to perform various network analyses on the network. For example, the network model can be used by the tracing module 245 to determine for any given vertex in the network (e.g., corresponding to a selection made by a user on a map), the set of all vertices that are upstream and/or downstream of that vertex, with regard to the direction of flow of the network commodity (e.g., electric power, water, gas, electromagnetic signal, and/or the like). The rendering engine 235 can then render all the features that are upstream of the vertex and all the features that are downstream of the vertex in distinct styles (e.g., by using different coloring schemes or highlighting) to clearly illustrate the flow path of respective electrical phases through the features starting from the source vertex.

Figure 3:
FIG. 3 is a graphical diagram illustrating an adjacency list for an undirected graph based on GIS feature data from a GIS database.

In some embodiments, the undirected graphing module 220 utilizes the geometric information in the GIS feature data to construct an undirected graph. As used herein, an undirected graph or an undirected network is a set of adjacency relationships between objects. An adjacency relationship between objects is represented by a commutative pair of object IDs. Suppose one of the endpoints of PrimaryConductor 101 coincides with the location of Switch 10. The undirected graphing module 220 recognizes this connection or adjacency between PrimaryConductor 101 and Switch 10 and in response, creates an adjacency relationship between those objects, represented by an ordered pair of object IDs: (101, 10). Since it is an undirected graph, the adjacency relationship is commutative, so the undirected graphing module 220 also creates a complementary ordered pair (10, 101). Once the adjacency relationships between objects have been determined, the undirected graphing module 220 generates an adjacency list or data structure representing the undirected graph. An example of the adjacency list representing the undirected graph constructed from a set of GIS feature data is depicted in FIG. 3. As illustrated, the adjacency list 300 includes a collection of object IDs and adjacent object IDs. In other words, the adjacency list 300 associates each object in the undirected graph with a set of neighboring objects. For example, object ID 1 is associated with its neighbor object ID 100, and object ID 100 is associated with its neighbors which include object ID 1, as well as object ID 10. In alternative embodiments, a GIS database can be the source of the adjacency list or data structure representing the undirected graph.

The directed graphing module 225 operates on the undirected graph, performing a series of traversals of the undirected graph, beginning at each object that is the source vertex to construct a directed graph. As used herein, a directed graph or a directed network is a set of objects having adjacency relationships, where all the adjacency relationships are directed from one object to another. When traversing the undirected graph, the directed graphing module 225 pays attention to selected attributes of certain objects that are of interest to the application domain. In the domain of electric power distribution, for example, the directed graphing module 225 examines the PhaseDesignation attribute of conductor vertices in the graph and to the ClosedPhases attribute of vertices representing sectionalizing devices. The directed graphing module 225 then uses these attributes to determine, at each step in the traversal, which of the electrical phases that reach a vertex via a given adjacency can be permitted to continue on to the other adjacencies of the vertex. For example, a switch which is open on all three phases blocks all phases, and thus a traversal halts upon reaching any open switch. By way of another example, if a traversal brings phases ABC up to a switch that is closed on phases BC but open on phase A, then only phases B and C will be allowed to pass on to the conductor on the far side of the switch. In other words, each time a traversal reaches a vertex $V_2$ coming from an adjacent vertex $V_1$, the directed graphing module 225 creates, in a new graph, a directed edge ($V_1$, $V_2$) that carries two additional attributes: SourceID and Phases. The SourceID attribute identifies the source vertex from which the traversal began. The SourceID attribute, in some embodiments, effectively serves as an identifier for the entire distribution circuit that is energized by that source. The Phases attribute indicates which electric phases reach all the way from that source to vertex $V_2$, arriving via vertex $V_1$.

The directed graphing module 225 performs a traversal of an undirected graph to output an adjacency list for the directed graph as illustrated in FIG. 4. The adjacency list 400 for the directed graph includes a set of directed adjacencies with corresponding Source and Phase attributes. The adjacency list 400 readily supports a tracing operation, i.e., enumerates, for any given vertex in the graph, the set of all vertices that are downstream of that vertex, and all the vertices that are upstream of that vertex. For example, from the data structure it is apparent that vertices 50 and 51 are downstream of vertex 10. The adjacency list 400 can also support other flavors of network analyses.

The mapping module 230, in some embodiments, manipulates the adjacency list representing the directed graph to optimize the look up performance for network analysis (e.g., tracing or any other operations or analyses), so that the look up performance does not become progressively worse as the size and complexity of a distribution circuit increases. In some embodiments, the mapping module 230 achieves the optimization by renumbering the objects in the directed graph so that the adjacency list for the directed graph can be stored in the form of an array where the array index serves as a proxy for the object's original ID as known to the GIS. Indexing the array in this manner enables random access to the adjacencies for any given vertex in the network, so that the lookup complexity for adjacencies is O(1). The mapping module 230 creates a mapping of GIS IDs to array indexes in the network model, and vice versa, so that the start object for a tracing action can be converted into the corresponding array index, and the trace results, which are developed as a set of array index values to represent the traced objects, can be converted into GIS IDs for those objects. In some embodiments, the adjacency list for the directed graph can be stored in the form of hashtables. In other embodiments, the mapping module 230 may be optional.

In some embodiments, the specialized data structure representing the network generated by the network modeling engine 215 is stored in a local storage (e.g., cache memory). When a user selects an object on a map to see the tracing results, the tracing module 245 accesses the network model data 280 to look up objects that are upstream and/or downstream of the object. Because of the caching of the network model data, there is no need to start from the GIS feature data or data representing the undirected graph and traverse the undirected graph again. Instead the directed graphing module 225 will have already performed the traversal of the undirected graph once to create the directed graph and in some embodiments, the mapping module 230 will have already converted the data structure for the directed graph into an array or hashtable format and stored the array or hashtable in the local storage. This means that in addition to the upstream and downstream orientations, electrical phases and information about the power source are precalculated and can be quickly recalled from the cache memory for tracing operations or to respond to attribute queries on any object in the circuit. For example, a user can select any object on a circuit, the network analysis module 240 can access the network model data 280 to recall information such as the power source for that object and the phases that reach the object from the power source and instantly display the results on the map, without performing additional calculations or network operations (e.g., communicating with a server over a communication network).

In some embodiments, the structure of the output from the mapping module 230, i.e., a directed graph streamlined for electric circuit tracing in both upstream and downstream directions and other network analyses, can be fully represented in an object oriented programming language using two classes: one class to represent the directed edges with their attributes, and the network class itself that includes the network objects, the adjacencies between the objects (i.e., the directed edges), and the mapping of network object IDs to array index values. FIG. 5 depicts an example code representation 500 of an electric network model expressing the directed edge class and the network class using C# programming language.

In some embodiments, the adjacency list representing the undirected graph (generated by the undirected graphing module 220 or received from the GIS database 130) can support at least some of the operations relating to visualization, network analysis (e.g., tracing, load flow analysis, operating voltage calculations), validation and/or editing on a distribution network. As such, the adjacency list representing the undirected graph can be stored locally on the client device (e.g., in a cache memory) in its original form, or in a form (e.g., array, hashtable) optimized for lookup speed (e.g., via the mapping module 230).

In some embodiments, the network configuration change detector 260 can detect changes to configuration of a network. Network configuration changes that the network configuration change detector 260 can detect can include, but are not limited to: changes in network topology (e.g., adding, deleting, moving, and/or swapping components or features) and changes in component configuration (e.g., changing diameter of a pipe, changing kVA rating of a transformer). The network configuration change detector 260 can notify the network analysis module 240 and/or the rendering engine 235 when any network configuration changes are detected.

In some embodiments, the network analysis module 240, via its components, can perform various network analyses on distribution networks. In some embodiments, the validation engine 250 listens for network configuration changes as a user builds out a network (e.g., via network configuration change detector 260) to inspect the network for invalid network configurations that do not meet requirements and/or standards specified by validation rules 285 that are stored locally. The validation rules can target specific issues such as insufficient signal strength and powering overcurrent and undervoltage, depending on the type of distribution network. The validation rules can be configured and extended to target the specific requirements of a user and/or organization.

By way of example, consider a Radio Frequency (RF) network design. One way to validate the RF network design is to traverse the network from its signal source to all downstream components. The network traversal requires many iterations over the adjacency list. Starting with the signal source vertex, one approach to performing this traversal is to read the adjacent (downstream) components, push the non-visited, adjacent vertex identifiers onto a stack, pop the next vertex identifier off this stack, perform the necessary operations with the current vertex, push the adjacent vertices onto the stack, and continue this loop until no items remain on the stack to visit.

Some network configuration changes have far reaching impacts on various aspects of the network. For example, in the case of a RF network design, network configuration changes can impact RF signals and component powering. While some network evaluation optimizations may be possible, most network changes to topology or component configuration can involve the validation engine 250 evaluating all components on a leg off a node or even the entirety of the network connected to a common node against RF network validation rules. In some embodiments, the validation engine 250, via the power calculation engine 255, can reevaluate all powering rules on the common power network fed by a power supply in the event any change impacting network topology or internal powering configuration is detected (e.g., by the network configuration change detector 260).

Before validation of component powering can be performed, the power calculation engine 255 can calculate the voltage and current through each component of the RF network. In some instances, to resolve these values the entire network powered by a power supply can be determined. While power delivered to the active components of an RF network is delivered along the same cables providing the RF signals to and from the optical node, the power network does not typically have the same topology as the RF network. The powering network for a component may span multiple node boundaries through the use of power inserters and coax cable that bridge networks to reduce the number of power supplies necessary to drive a Hybrid fiber-coax (HFC) network. Likewise, a single RF network may have sections powered by power supplies bridged from other node boundaries. The power calculation engine 255 can calculate the current and voltages through components by determining the logical, hierarchical powering network fed by a power source. The determination can include locating a power supply and using the RF network graph (e.g., directed graph) to determine the components connected to this power supply. Further traversal downstream from a component can mean deeper inspection of a component's internal configuration by the power calculation engine 255 to determine which ports can supply power and which have had an internal fuse pulled thereby blocking power through a port. Once the power network has been determined, the power supply specifications can be referenced to find the operating voltage of the power supply. The entire power network can be set at this operating voltage and then an iterative algorithm can be used to evaluate the current draw and resultant voltage in and out of each component until the total current draw residual at the power supply is within a predefined margin. For cables, the voltage drop can be determined by the cable length, resistance per length, and current draw through the cable. Active components use switching power supplies to pull a relatively constant power—as input voltage drops the current draw will increase. This current to voltage profile can be defined within the catalog specification for a given active component. These properties for cables and active components can be used in each step of the iterative algorithm. After voltages and current draws are calculated they are held by the power calculation engine 255 in an immutable data structure (e.g., as power calculations data 290 in a local storage) and may be looked up by the validation engine 250 to evaluate against the power validation rules to ensure the voltage input into active components is at or above minimum requirements and total current passing through any component is below the component's operating amperage rating. In some embodiments, the power calculation data can also be accessed by the rendering engine 235 for feedback in the user interface (UI) of the disclosed system.

In the case of an electric distribution circuit, when load is added downstream of a component, that load can augment the load on all the conductors upstream of the component all the way back to the circuit source. In some embodiments, the power calculation engine 255 can perform a load flow analysis to determine the amount of current flowing through the conductors. Based on the calculated current and applicable validation rules, the validation engine 250 can determine if any of the conductors are too small in size. The validation engine 250 can then provide feedback indicating that the conductors are carrying excess load. Similarly, adding load anywhere on the feeder can bring voltages down almost everywhere on the circuit. The validation engine 250 and the power calculation engine 255 can together determine if the additional load causes the voltage at the component to drop below a minimum threshold, typically set by the utilities.

The validation engine 250 can store the results from the validation for notification and/or other purposes. In some embodiments, the validation engine 250 can capture each violation in a validation result object to provide a user-friendly message about the issue, severity, and information about the components in violation. The collection of validation result objects can be used to provide a list of issues to be addressed in the design. In some embodiments, the violations can be presented in the geographic and schematic views of the network (e.g., rendered by the rendering engine 235). The validation results 295 can be stored locally in some embodiments.

In some embodiments, the disclosed system allows real-time analysis and calculations to be performed on a network design even as the network design is being modified. This functionality is enabled by the distribution network modeling engine 215 that creates new data structures to represent the states of the network as modifications are made to a network design. For example, consider a network design that is being edited by a user. The current state of the network design is represented by a data structure, but the state of the network design after the modification is represented by a new data structure. With this approach, one thread can traverse the network to perform a network analysis, while another thread can perform a component swap on that same network to create a new data structure without changing the state of the network that the first thread is referencing. The multi-threaded approach utilized by the disclosed system improves the application performance, making it real-time or near real-time.

In some embodiments, the new data structure is generated by transforming the old data structure in such a way that the new data structure comprises of vertices that changed and reference points to vertices that did not change. By creating the new data structures to include reference points to the old data structure, the disclosed system can reduce the memory cost of storing and tracking the various states of a network design. Moreover, by taking into account the information that typically changes as a group, one group can be separated from another to reduce the number of new data structures that need to be instantiated during the lifetime of the network design. The memory savings described herein can be achieved using Microsoft .NET's Immutable Collections library in some embodiments.

In some embodiments, the network model data 280, power calculations data 290, validation results 295, and/or other application data can be periodically uploaded to the host server 125 and/or another cloud repository for back-up or other purposes.

3. Example Processing

Figure 6A:
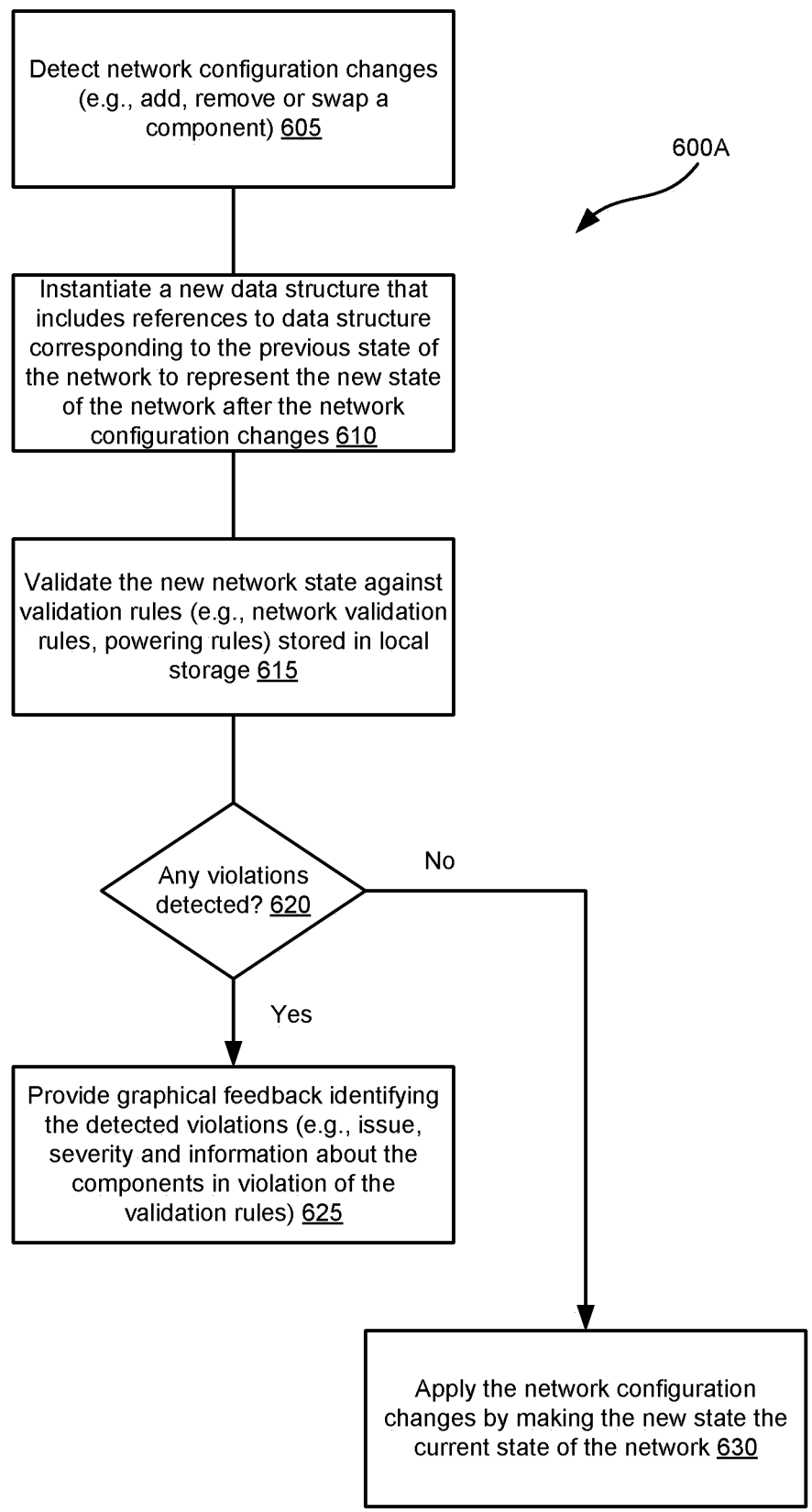
FIG. 6A is a logic flow diagram illustrating an example method of validating distribution network configuration changes in client environment in accordance with some embodiments of the disclosed system.

FIG. 6A is a logic flow diagram illustrating an example method of validating distribution network configuration changes in client environment in accordance with some embodiments of the disclosed system.

At block 605, the disclosed system (e.g., via network configuration change detector 260 and/or validation engine 250) can detect network configuration changes. Network configuration changes can include, for example, addition, removal, moving or swapping of one or more components in a network design. The network configuration changes can also include changing of any component's internal configurations. At block 610, the disclosed system (e.g., via the network modeling engine 215) instantiates a new data structure to represent the state of the network after the network configuration changes. In some embodiments, the new data structure has a smaller memory footprint compared to the data structure corresponding to the original state of the network when it was loaded. The new data structure does not include the complete set of objects in the network. Instead, the new data structure includes only the objects that changed, and references the rest of the objects by pointing to the data structure corresponding to the previous state of the network.

At block 615, the disclosed system (e.g., via the validation engine 250) validates the new network state against validation rules (e.g., validation rules 285) stored locally. The validation rules can include network validation rules, powering rules and/or the like. In some embodiments, the local storage can include a cache memory. If any violations of the validation rules are detected at decision block 620, the disclosed system provides graphical feedback identifying the detected violations at block 625. In some embodiments, the graphical feedback can provide an indication of the issue, severity, information about the components in violation of the validation rules, and/or the like. In some other embodiments, the graphical feedback can include recommendations for remedying the violations. If no violations of the validation rules are detected, the disclosed system applies the network configuration changes, making the new state the current state of the network at block 630. It should be noted that in some embodiments the network configuration changes and the validation of the network configuration changes can occur on a client device while it is disconnected from the GIS and/or communication network.

Figure 6B:
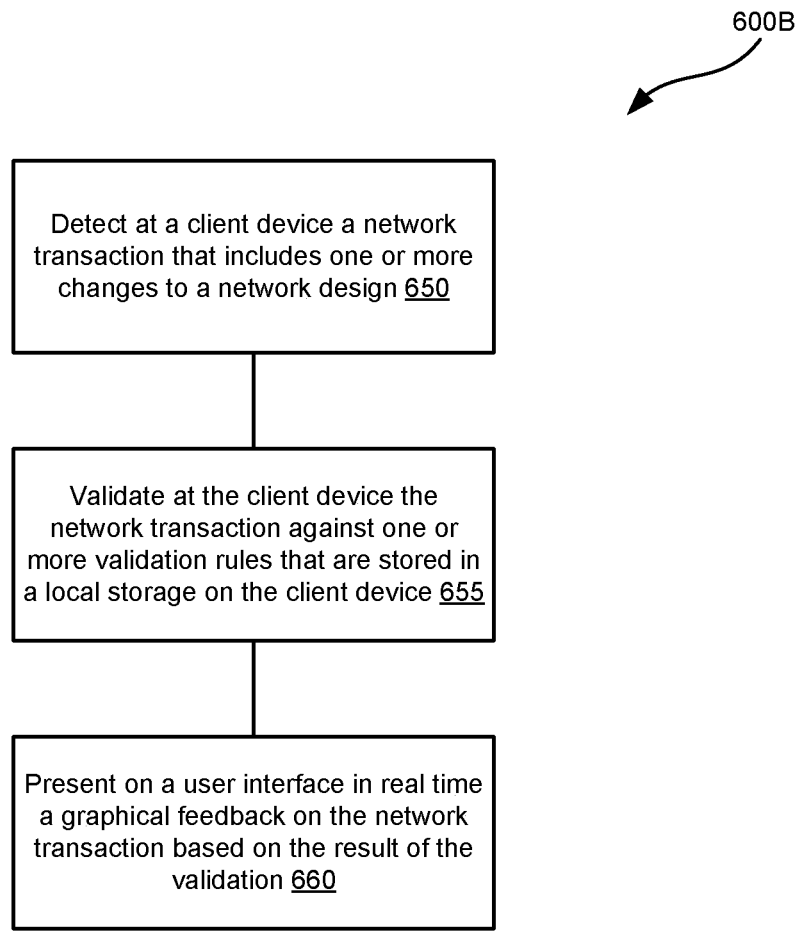
FIG. 6B is a logic flow diagram illustrating an example method of providing a graphical feedback on a network transaction in real time in accordance with some embodiments of the disclosed system.

FIG. 6B is a logic flow diagram illustrating an example method of providing a graphical feedback on a network transaction in real time in accordance with some embodiments of the disclosed system.

The example method 600B starts with the disclosed system detecting at a client device a network transaction or network model transaction that includes one or more changes to a network design at block 650. The network transaction can include, for example, adding, removing, swapping or moving components in the network design and changing internal configuration of one or more components. At block 655, the disclosed system validates at the client device the network transaction against one or more validation rules that are stored locally on the client device. The validation rules can be rules pre-selected or pre-defined for the network design. Upon validation one or more issues or errors can be detected if the one or more changes violate the one or more validation rules. At block 660, the disclosed system provides in real time a graphical feedback on the network transaction based on the result of the validation. For example, if the validation result includes one or more errors or issues, the disclosed system displays those errors within the design environment (e.g., in the geospatial view, schematic view) for the user to see and/or select to navigate to the location of those errors. In some instances, the graphical feedback can include information on how to remedy the errors. It should be noted that in some embodiments the network transaction and the validation of the network transaction can occur on the client device while it is disconnected from the GIS and/or communication network.

Figure 7A:
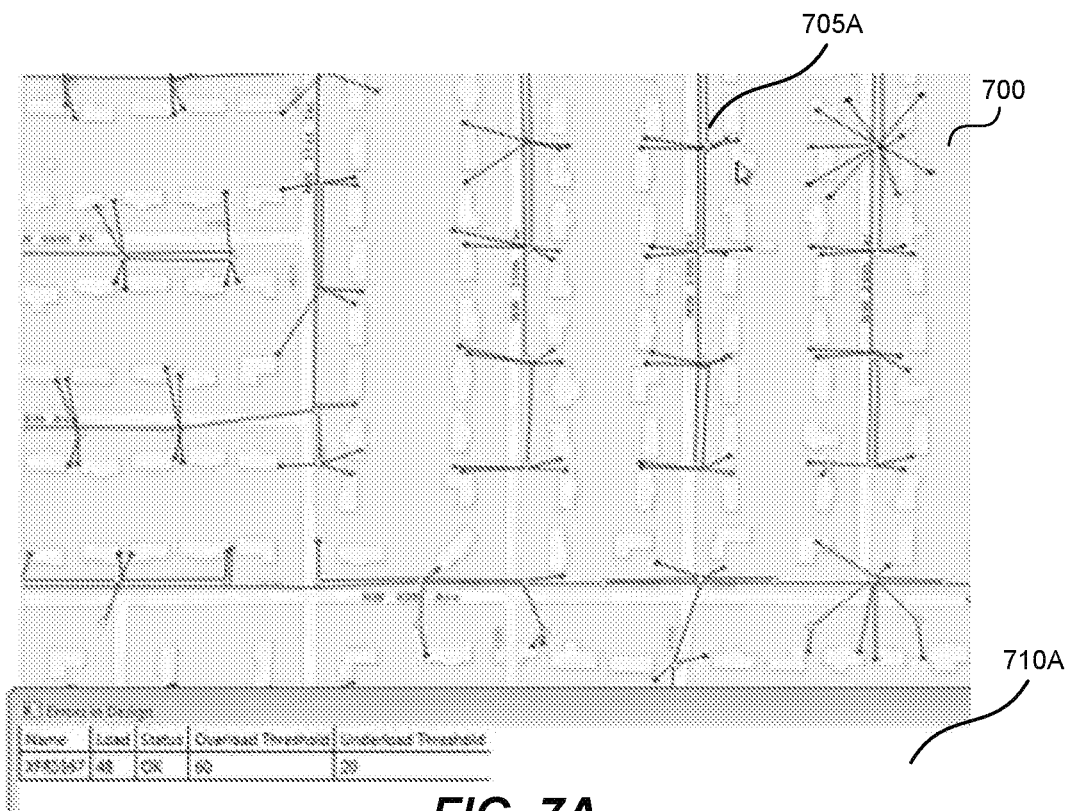
FIGS. 7A and 7B are schematic diagrams illustrating graphical feedback displayed in response to a network configuration change in accordance with some embodiments of the disclosed system.
Figure 7B:
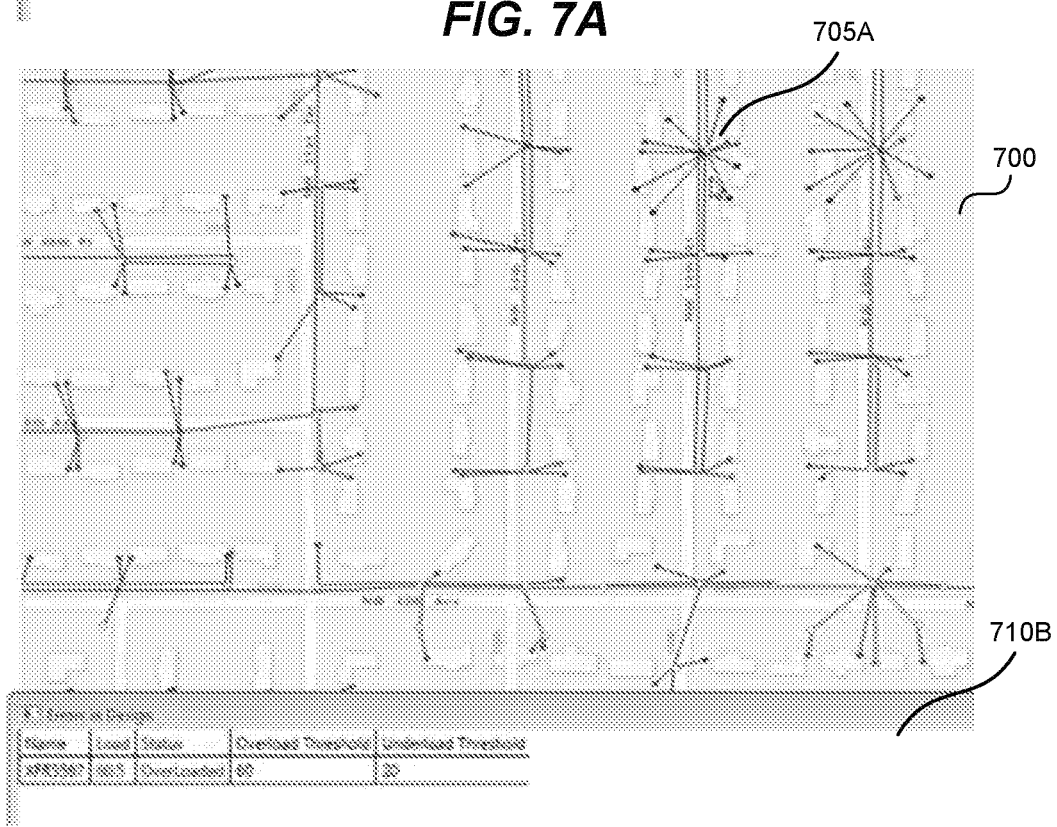

FIGS. 7A and 7B are schematic diagrams illustrating graphical feedback displayed in response to a network configuration change in accordance with some embodiments of the disclosed system.

Referring to FIG. 7A, the geoschematic view 700 corresponds to an electric distribution network and depicts a cursor near a transformer object 705A that is connected to four service points. The disclosed system determines that the service points are downstream of the transformer 705A based on the network model that is stored locally, and calculates the load on the transformer 705A by adding up estimated load for each of the four service points that are fed by the transformer 705A. The disclosed system then displays, in apparent real time, the resulting load on the transformer 705A (48 kVA in this instance), along with other information such as the name, status, overload threshold and underload threshold on a pop up window 710A or a validation details list (not shown). A user can navigate to the location of the issue or error directly from the pop up window or validation details list. Thus, the disclosed system can immediately present information about network objects that can help a user make design decisions. For example, by presenting information that the transformer 705A load is below the overload threshold, the user can consider whether to additional service points downstream of the transformer 705A.

Referring to FIG. 7B, the user decides to add additional service points to the transformer 705A. The user edits the network by adding six additional service points to the transformer 705A. Addition of these service points causes the system to recalculate the load on the transformer 705A. As depicted in the pop up window 710B, the load downstream of the transformer 705A is recalculated to be 60.5 kVA. Based on the validation rules, the disclosed system determines that the addition of the six service points violates the overload threshold of 60 kVA and indicates the violation by displaying the status as "overloaded." In this manner, the disclosed system can provide immediate graphical feedback on decisions made by the user, which helps to streamline the network design process by saving on time and effort.

When load is added downstream of a component, that load can augment the load on all the conductors upstream of the component all the way back to the circuit source. In some embodiments, the disclosed system can perform a load flow analysis to determine the amount of current flowing through the conductors. Based on the calculated current and applicable validation rules, the disclosed system can determine if any of the conductors are too small in size. The disclosed system can then provide feedback indicating that the conductors are carrying too much load. Similarly, adding load anywhere on the feeder can bring voltages down almost everywhere on the circuit. The disclosed system can determine if the additional load causes the voltage at the component to drop below a minimum threshold (typically utilities require the voltage to be within 5% of 120V at the consumer location).

4. Example Computer Systemization

Figure 8:
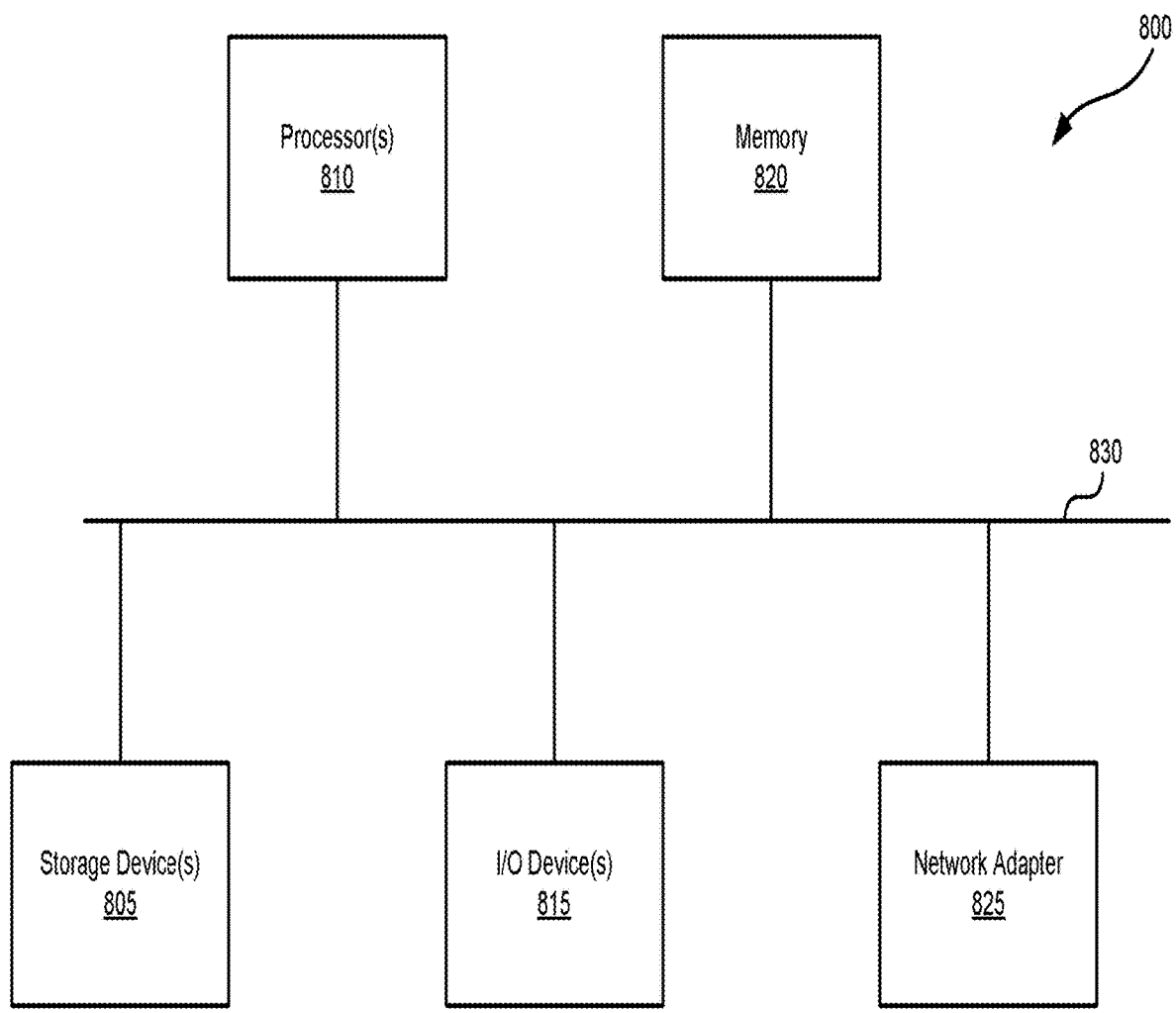
FIG. 8 is a block diagram of an exemplary apparatus that can perform various operations, and store various information generated and/or used by such operations in accordance with some embodiments of the disclosed system.

FIG. 8 is a block diagram of an exemplary apparatus that can perform various operations, and store various information generated and/or used by such operations in accordance with some embodiments of the disclosed system.

The apparatus can represent any computer described herein. The computer 800 is intended to illustrate a hardware device on which any of the entities, components or methods depicted in the examples of FIGS. 1-7 (and any other components described in this specification) can be implemented, such as a server, client device 105, storage devices, databases (e.g., GIS database 130), network modeling engine 215, network configuration change detector 260, rendering engine 235, and network analysis module 240. The computer 800 includes one or more processors 810 and memory 820 coupled to an interconnect 830. The interconnect 830 is shown in FIG. 8 as an abstraction that represents any one or more separate physical busses, point to point connections or both connected by appropriate bridges, adapters, or controllers. The interconnect 830, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 810 is/are the central processing unit (CPU) of the computer 800 and, thus, control the overall operation of the computer 800. In some embodiments, the processor(s) 810 accomplish this by executing software or firmware stored in memory 820. The processor(s) 810 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 820 is or includes the main memory of the computer 800. The memory 820 represents any form of random access memory (RAM), read-only memory (ROM), flash memory, or the like, or a combination of such devices. In use, the memory 820 may store a code. In some embodiments, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 810 through the interconnect 830 are a network adapter 825, a storage device(s) 805 and I/O device(s) 815. The network adapter 825 provides the computer 800 with the ability to communicate with remote devices, over a network and may be, for example, an Ethernet adapter or Fibre Channel adapter. The network adapter 825 may also provide the computer 800 with the ability to communicate with other computers within a cluster. In some embodiments, the computer 800 may use more than one network adapter to deal with the communications within and outside of the cluster separately.

The I/O device(s) 815 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 820 can be implemented as software and/or firmware to program the processor(s) 810 to carry out actions described above. In certain embodiments, such software or firmware may be initially provided to the computer 800 by downloading it from a remote system through the computer 800 (e.g., via network adapter 825).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the technology introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device(s) 805 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

The disclosed technology can also be adapted to other aspects of a utility distribution system such as the transmission/sub-transmission networks or the like.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments have been described herein for purposes of illustration, but that various modifications may be made without deviating from the spirit and scope of the disclosed system. Accordingly, the disclosed system is not limited except as by the appended claims.

What is claimed is:

1. A method for validating a design of a distribution network in a client environment comprising:
    detecting, on a client device, a network model transaction to modify one or more elements of a distribution network model, wherein a first state of the distribution network model is represented using a first data structure containing one or more objects;
    identifying, on the client device, at least one component in the distribution network model impacted by the network model transaction;
    calculating, on the client device, at least one parameter associated with the at least one identified component;
    generating, on the client device, a second data structure including (i) one or more objects that changed in response to the network model transaction and (ii) one or more reference points to the one or more objects of the first data structure that did not change in response to the network model transaction, wherein the second data structure represents a subsequent state of the distribution network model relative to the first state of the distribution network model represented by the first data structure;
    validating, on the client device, the generated second data structure against one or more validation rules, the validating utilizing the at least one calculated parameter and a locally stored copy of the distribution network model; and presenting in real time a graphical feedback on the network model transaction based on successful validation of the second data structure.

2. The method of claim 1, wherein a result of the validating includes a violation of the one or more validation rules.

3. The method of claim 2, wherein the graphical feedback identifies the violation and a component in the distribution network model associated with the violation.

4. The method of claim 1, wherein the distribution network includes any one of: a water distribution network, a gas distribution network, an electric distribution network, or a telecom distribution network.

5. The method of claim 1, wherein in an electrical distribution network, validating includes performing a load flow analysis.

6. The method of claim 1, wherein in an electrical distribution network, validating includes calculating fault currents.

7. The method of claim 1, wherein in a telecom distribution network, validating includes performing signal and powering calculations.

8. A non-transitory machine-readable medium comprising instructions which when executed by a client device execute a method comprising:

detecting a user action corresponding to a change of one or more elements of a distribution network model, wherein a first state of the distribution network model is represented using a first data structure containing one or more objects and the user action is directed to manipulate at least one first component in the distribution network model;

identifying at least one second component in the distribution network model impacted by the user action;

calculating one or more parameters associated with the at least one first component and the at least one identified second component;

generating a second data structure including (i) one or more objects that changed in response to the network model change and (ii) one or more reference points to the one or more objects of the first data structure that did not change in response to the network model change, wherein the second data structure represents a subsequent state of the distribution network model relative to the first state of the distribution network model represented by the first data structure;

validating the user action against a locally stored copy of the generated second data structure using the one or more calculated parameters and one or more locally stored validation rules; and displaying in real time an indication whether the user action is valid or invalid based on the successful validation of the second data structure.

9. The non-transitory machine-readable medium of claim 8, wherein the user action to manipulate the at least one first component in the distribution network model includes a user action to add, move, remove or swap the at least one first component.

10. The non-transitory machine-readable medium of claim 8, further comprising storing a result of the validating locally on the client device.

11. The non-transitory machine-readable medium of claim 8, wherein the indication that the user action is invalid includes identification of one or more of the at least one first and second components in violation of the one or more validation rules and information about issue and severity of the violation.

12. The non-transitory machine-readable medium of claim 8, wherein when the distribution network model is for an electric utility distribution network, calculating the one or more parameters includes calculating a voltage and current through the at least one first and second components in the distribution network model.

13. The non-transitory machine-readable medium of claim 8, wherein the one or more validation rules are configurable by at least one of: a user or an entity managing the distribution network model.

14. The non-transitory machine-readable medium of claim 8, wherein upon success of the validating, manipulation of the at least one first component in the distribution network model causes a state of the distribution network model to be updated to a new state.

15. A system for validating a design of a distribution network for a utility in a client environment comprising:

a memory; and one or more processors configured to execute instructions stored in the memory to:

detect a network model transaction to modify one or more elements of a distribution network model, wherein a first state of the distribution network model is represented using a first data structure containing one or more objects;

identify at least one component in the distribution network model impacted by the network model transaction;

calculate at least one parameter associated with the at least one identified component;

generate a second data structure including (i) one or more objects that changed in response to the network model transaction and (ii) one or more reference points to the one or more objects of the first data structure that did not change in response to the network model transaction, wherein the second data structure represents a subsequent state of the distribution network model relative to the first state of the distribution network model represented by the first data structure;

validate the generated second data structure against one or more validation rules, the validating utilizing the at least one calculated parameter and a locally stored copy of the distribution network model; and provide in real time a graphical feedback on the network model transaction based on successful validation of the second data structure.

16. The system of claim 15, wherein the graphical feedback on the network model transaction that is in violation of the one or more validation rules includes information about at least one component associated with the violation and issue and severity of the violation.

17. The system of claim 15, wherein the network model transaction to modify one or more elements of the distribution network model includes at least one of: adding, moving, removing, swapping or changing internal configuration of at least one component in the distribution network model.

18. The system of claim 15, wherein the graphical feedback identifies a violation and a component in the distribution network model associated with the violation.

19. The system of claim 15, wherein the distribution network includes any one of: a water distribution network, a gas distribution network, an electric distribution network, or a telecom distribution network.

20. The system of claim 15, wherein in an electrical distribution network, validating includes performing a load flow analysis.

\* \* \* \* \*